Feb. 3, 1970        E. C. BRAINARD II        3,492,962

SUB-SURFACE EFFECT VEHICLE

Filed May 31, 1968        4 Sheets-Sheet 4

INVENTOR.
EDWARD C. BRAINARD, II

ATTORNEYS

United States Patent Office 3,492,962
Patented Feb. 3, 1970

3,492,962
SUB-SURFACE EFFECT VEHICLE
Edward C. Brainard II, Marion, Mass., assignor to Braincon Corporation, Marion, Mass., a corporation of Massachusetts
Filed May 31, 1968, Ser. No. 733,631
Int. Cl. B63g 8/18, 8/12
U.S. Cl. 114—16   13 Claims

ABSTRACT OF THE DISCLOSURE

My disclosure concerns a hydrodynamic vehicle having a hull and laterally extending winglike hydrofoils. A submerged depressor vehicle is suspended from and is towed by the hull and produces a downwardly directed hydrodynamic lift in opposition to that generated by the hydrofoils thus tending to continually submerge the vehicle. When the vehicle is propelled under water in close proximity of the surface, it displays inherent depth and roll stability characteristics without the use of automatic controls by reason of the "sub-surface effect." Means are also provided for self-propulsion of the vehicle which means may be operated by a battery-powered electric motor when the vehicle is at increased depths, or an internal combustion engine when the vehicle is in proximity to the surface of the water. When close to the air-water interface, a snorkel may be extended from the vehicle upwardly into the atmosphere to enable air to be communicated to the internal combustion engine. Means are further provided for securing the depressor vehicle to the hull so that it may alternatively be precluded from generating any substantial downwardly directed lift and may be in an upward, out-of-the-way position.

SUMMARY OF THE INVENTION

My invention is directed toward a submergible hydrodynamic, self-propelled vehicle having a hull, hydrofoil means secured to and extending laterally from the hull in winglike fashion and a depressor vehicle that is attached to and towed by the hull. The depressor vehicle is effective to hydrodynamically generate a downwardly directed force in opposition to the lifting force of the hydrofoils as the vehicle is propelled through the water. The vehicle is intended to take advantage of the "sub-surface effect" and when doing so the vehicle displays inherent depth, roll and pitch stability characteristics. The "sub-surface effect" is a dynamic phenomenon that occurs just below the air-water interface and which causes an alteration in the pressure distribution of the hydrofoil in a manner that effectively reduces the lift of the hydrofoil as it approaches the surface of the water. The depressor vehicle, which is intended to be towed substantially below the surface of the water, is not subjected to the sub-surface effect and therefore tends to maintain a constant negative hydrodynamic submerging force on the hull. Thus as the hydrofoil approaches the air-sea interface a depth will be reached where a balance of dynamic forces acting on the hydrofoils and depressor vehicle come to equilibrium, the entire vehicle stabilizing at that equilibrium depth.

Another aspect of my invention is directed to a means for maintaining roll and pitch stability of a vehicle that is submerged at depths below the range of the sub-surface effect. Inherent stability is maintained at these more substantial depths by means of the manner in which the depressor vehicle is attached to the hull.

A further object of my invention is to provide a submergible vehicle which hydrodynamically maintains its submerged condition when propelled while being in a state of statically positive buoyancy so that in the event of power failure or other emergency the vehicle will rise to the surface of the water. Means are also provided to render the vehicle neutrally buoyant for improved handling and response when operating at increased depths which neutral buoyancy may be readily changed to positive buoyancy to enable the vehicle to float upwardly in a bow-up attitude. This "fail-safe" characteristic of my invention greatly enhances the safety with which the vehicle may be operated in that remedial action may be taken from a floating orientation more easily than from a more dangerous submerged condition as would be the case with a neutrally buoyant vehicle.

A further object of my invention is to provide a submergible vehicle of wide versatility having excellent maneuvrability characteristics.

My vehicle is also quite suitable as an exploration vehicle for conducting marine research or inspecting underwater conditions in general. It is of dry-cabin construction to keep the occupants dry and therefore more alert for extended periods of time.

When completely submerged, the vehicle may be trimmed to neutral or negative buoyancy to permit hovering on the bottom or anchoring. Safety ballast is provided which may be dropped in case of emergency and allow the vehicle to rise to the surface with a bow-up attitude permitting easy exit from the main hatch.

My invention also includes means for retracting the depressor vehicle upwardly towards the hull so that it may be secured to the hull and be ineffective in generating any substantial submerging force. This is desirable for example when anchoring or hovering at the ocean floor, when operating the vehicle purely as a surface craft or in general when it is not necessary to provide a dynamic submerging force.

Another object of my invention is to provide a water vehicle displaying inherent attitude stability to enable the operator to direct his attentions to the needs of the mission.

An additional object of my invention is to provide a submergible vehicle having a high degree of attitude stability to greatly facilitate training of operators for the vehicle.

A further object of my invention is to provide an underwater vehicle that is inherently attitude stable and is therefore suitable for one-man missions.

Other objects and advantages of my invention will be apparent from the following detailed description and drawings wherein.

Figure 1:
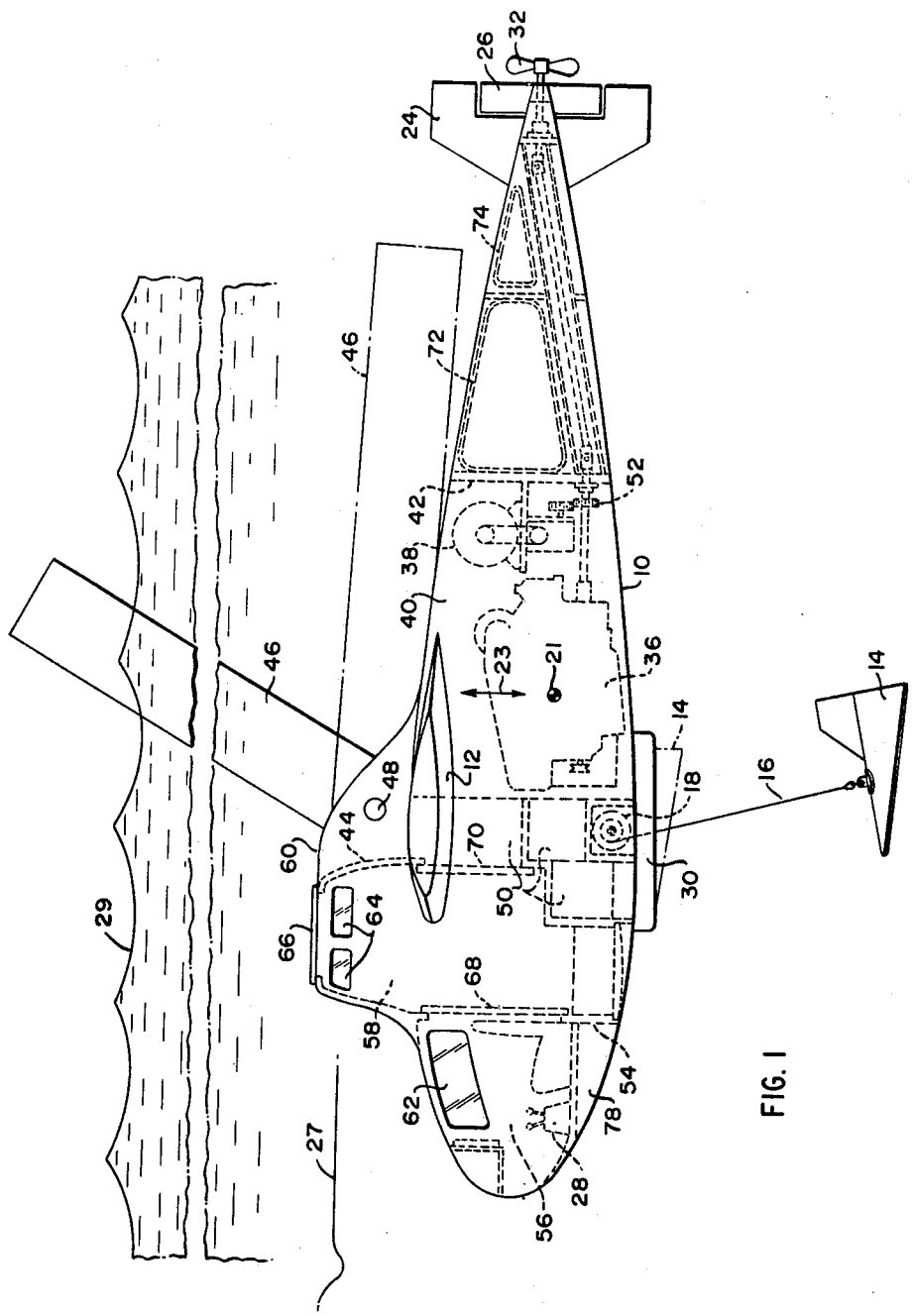
FIG. 1 is a side elevation of my device illustrating the internal elements in phantom.
Figure 2:
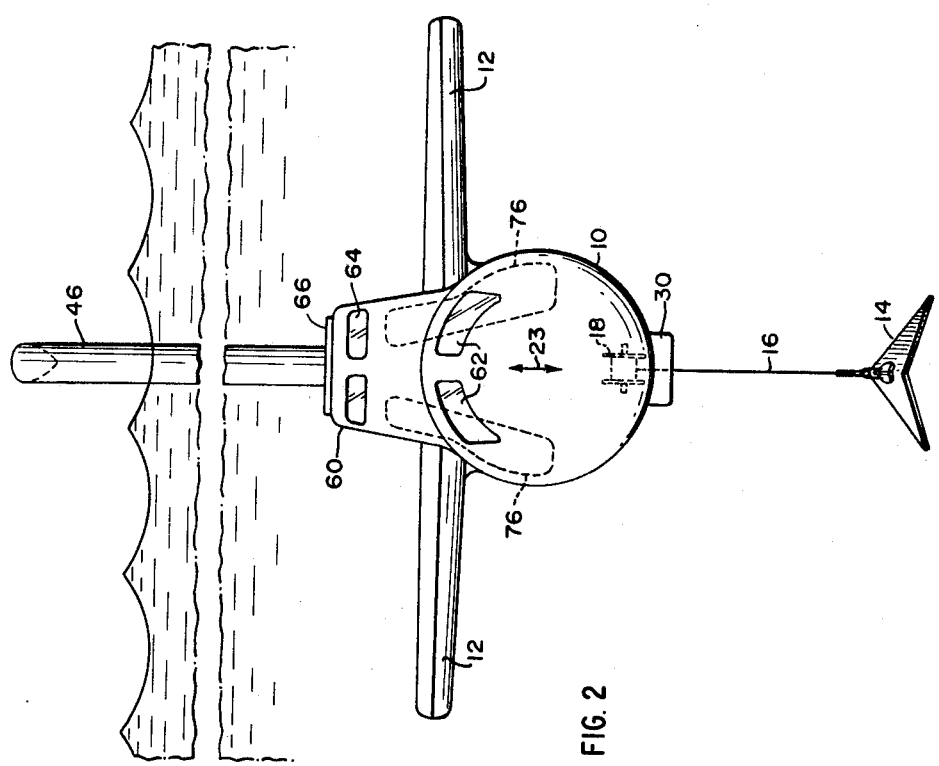
FIG. 2 is a front elevation of my vehicle.
Figure 3:
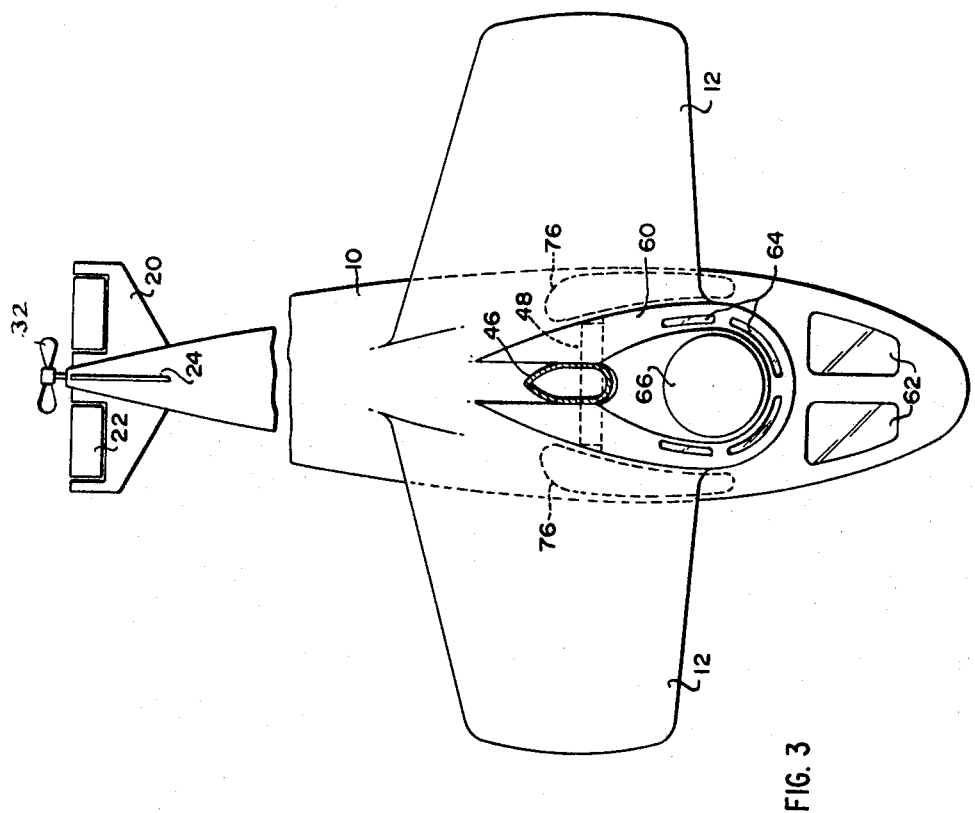
FIG. 3 is a plan view of my vehicle.

As shown in FIGURES 1 and 2, the illustrative body of my invention includes a hull 10 having a pair of hydrofoil wings 12 that are secured to and extend laterally of the hull. The wings 12 are preferably disposed in proximity to the top of the hull and are intended to produce a positive lift tending to raise the vehicle towards the surface of the water as the vehicle is propelled through the water. A depressor vehicle 14 is attached to the underside of the hull 10 by means of a flexible cable 16 which may be retracted upwardly within the hull 10 by a winch 18 to draw the depressor vehicle 14 upwardly into engagement with the bottom of the hull for a purpose later described. As shown in FIGURE 3 a horizontal stabilizer fin 20 having a movable elevator 22 is mounted to the tail end of the hull and serves to provide a manual pitch attitude control. A vertical fin 24 and a rudder 26 are supported at the tail end of the hull 10 and serve to provide stabilization and directional control of the vehicle about its axis of yaw.

The depressor vehicle is preferably but not necessarily of the V-Fin type disclosed in my U.S. Patent No. 3,137,264 which has inherent characteristics that will develop a downwardly directed negative lift as it is towed through the water. As more fully disclosed in my aforementioned U.S. patent, the stability characteristics of the depressor vehicles 14 are such that as it is towed through the water, it will stabilize in a predetermined attitude which will continuously develop the desired downwardly directed negative lift irrespective of the attitude of the vehicle from which it is towed.

My vehicle is intended to operate alternatively as a floating surface vehicle, as a sub-surface effect vehicle or as a deeply submerged vehicle operating at depths considerably below the air-water interface. When operating in proximity to the surface of the water, to take advantage of the "sub-surface effect" in which the positive lift generated by the wings 12 approach the surface of the water, I have found that the sub-surface effect diminishes rapidly when the wings 12 are at a depth below approximately two chord lengths of the surface. Appropriate sub-surface effect depths would be as indicated by the water surface levels 27, 29 in FIG. 1.

When functioning in the sub-surface mode with the wings 12 being disposed within approximately two chord lengths of the surface of the water, the vehicle is intended to be trimmed to a slightly buoyant condition for purposes later described, the magnitude of buoyancy being relatively small in comparison to the weight of the vehicle and the lifting forces developed by the wings 12 and depressor vehicle 14 so that for the purpose of appreciating the interplay of lifting forces between the wings 12 and depressor vehicle 14, the vehicle may be considered as being of substantially neutral buoyancy. When operating in the sub-surface mode, the vehicle is inherently stable about its roll axis and tends to maintain a constant depth below the surface of the water. The wings 12 and depressor vehicle 14 are so constructed that the positive lift generated by the wings 12 will be of a greater magnitude than the negative lift developed by the depressor vehicle 14 when both are traveling at the same speed. From this it should be appreciated that when the vehicle is operating in the sub-surface mode and begins to rise toward the surface of the water, the lift generated by the wings 12 will decrease by reason of the sub-surface effect thus enabling the relatively unvarying negative lift generated by the depressor vehicle 14 to overcome the positive lift of the wings and draw the vehicle downwardly. On the other hand, should the vehicle tend to become more submerged the greater lift generated by the wings 12 will overcome the negative lift of the depressor vehicle 14 thus causing the vehicle to rise toward the surface. Thus interplay of forces causes the vehicle to stabilize at substantially constant depth within the sub-surface effect range. It is preferable that the cable 16 be attached to the hull 10 approximately in line with the center of lift of the hydrofoils 12 to reduce any pitching movement due to an imbalance of lifting forces.

Figure 4:
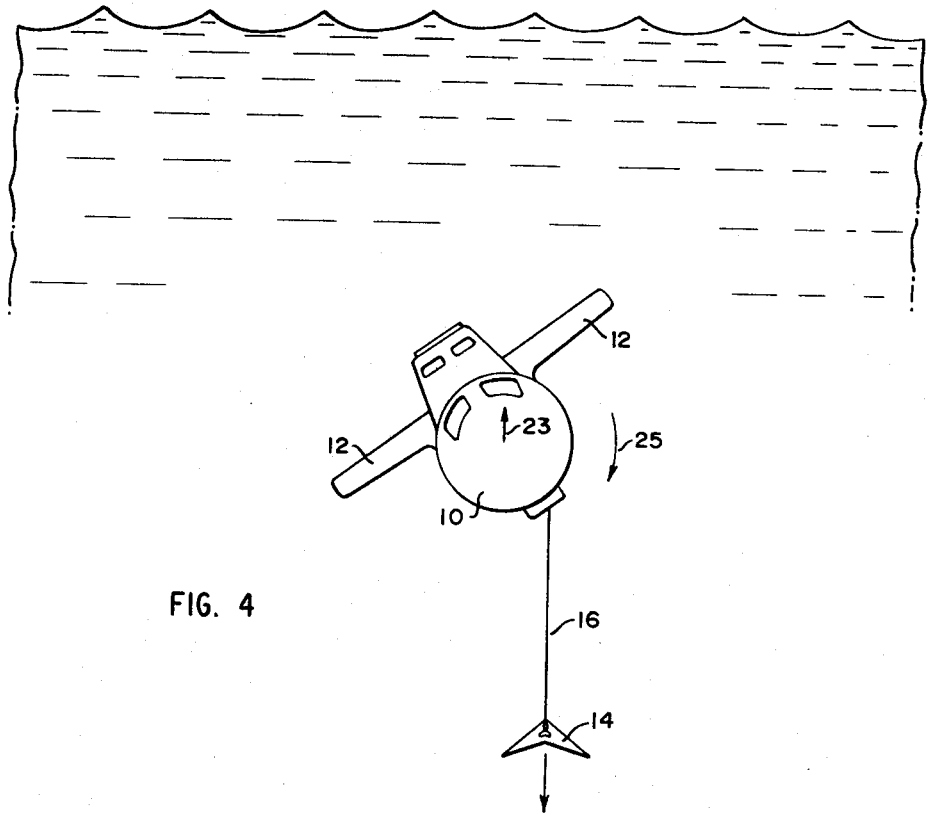
FIG. 4 is a front elevation of my vehicle in a rolled attitude and illustrating one of the roll stabilization devices.

When operating in the sub-surface mode the vehicle displays inherent roll stability which is caused by three primary factors. The first of these is that, for example, should the vehicle tend to roll to the left, the right wing 12 will rise towards the surface and will lose some of its lift due to the sub-surface effect acting on that wing alone. The left wing, being disposed at a greater depth, will generate an increased lift so that the cooperation between the decreased lift on the right wing and the increased lift on the left wing 12 will tend to roll the craft to the right of its level position. The second factor that contributes to the roll stability of the vehicle is the fact that the cable 16 which tows the depressor vehicle 14 is secured to the hull 10 so as to be in lateral alignment with and below the center of buoyancy 23 of the vehicle. When the vehicle rolls, the point at which the cable 16 is attached to the hull 10 will become shifted laterally off the center of buoyancy 23 thus creating a moment 25 in opposition to the direction of roll of the vehicle and tending to return the vehicle to a level position (see FIG. 4). In this regard it is imperative that the depressor vehicle 14 generate a downwardly directed force irrespective of the attitude of the hull 10 and hydrofoils 12. My aforementioned V-Fin arrangement displays such characteristics. The third primary factor that aids roll stability is the location of the center of gravity 21 below the center of buoyancy 23. When totally submerged and operating at slower speeds, this becomes the most important factor in roll stability. Additional roll stability is provided by designing the hydrofoils 12 with a dihedral angle as shown in FIG. 2.

Depth control of the vehicle may also be effected manually by control means, incorporated into a control console 28, the control means being operatively associated with the elevator by any conventional arrangement to override the lifting forces of the hydrofoils 12 and depressor vehicle 14 to enable a change to be made in the pitch of the craft and therefore the angle of attack of the hydrofoils 12 with respect to the water. When the depth is manually controlled, it may sometimes be desirable to retract the cable 16 by means of the winch 18 to draw the depressor vehicle 14 upwardly into engagement with a cradle 30 which accommodates the depressor vehicle 14 and effectively secures it to the underside of the hull 10 as illustrated in FIG. 1. The cradle 30 is preferably constructed as to support the depressor vehicle 14 at a relatively low angle of incidence with respect to the hull so that it may be disposed at a zero angle of attack and be ineffective in producing negative lift. It should also be noted that when the depressor vehicle 14 is secured to the bottom of the hull it is no longer in a freely towed condition and will not be able to extend at a substantially downward position irrespective of the attitude of the craft, but will assume the same attitude as that of the hull 10. Without the benefit of the downwardly directed negative lift of the depressor vehicle, the craft may be maintained at a constant depth solely by manual control of the elevator. The vehicle will still retain its roll stability characteristics as long as the wings 12 are maintained at a depth where the sub-surface effect may be utilized.

Submerging of my vehicle to greater depths below the sub-surface effect depth range may be accomplished in a number of ways. Submerging may be controlled solely by the elevator 22. It should be noted initially, however, that when the vehicle is submerged and it is desired to control its depth and direction solely by means of the control surfaces 22 and 26, the vehicle should be in a neutrally buoyant condition so that the only forces acting on the vehicle will be the dynamic forces generated by the control surfaces 22, 26 as the vehicle is propelled through the water. Introduction of either a positive or negative buoyant force which is unrelated to and functions independently of the dynamic forces generated by the control surfaces 22, 26 would cause the vehicle to change its depth in a manner unrelated to manipulation of the control surfaces and would therefore render manual control of the vehicle rather difficult, particularly if the speed of the vehicle were changed. To this end ballasting means, later described, is provided for controlling the buoyancy of the craft.

When it is desired to submerge and control the neutrally buoyant craft manually the elevator is operated to cause the nose of the vehicle to pitch downwardly which simultaneously decreases the angle of attack of the wings 12 thereby reducing the generated positive lift and inclining the direction of thrust of the propellor 32 downwardly. Submerging to a greater depth may be facilitated by enabling the depressor vehicle 14 to be in its freely towed condition illustrated in FIGURE 1, the downwardly directed negative lift produced by the vehicle 14 serving to increase the downwardly directed submerging forces on the vehicle. When operating at a greater depth inherent roll stability is provided primarily by the depressor vehicle 14, and the low position of the center of gravity 21 with respect to the center of buoyancy 23, the wings 12 being below the effective sub-surface effect depth. Roll stability at these depths is further enhanced by the dihedral effect of the hydrofoils 12.

The above mentioned method of submerging my vehicle basically requires that the pitch of the vehicle be inclined downwardly and that continous propulsion be provided to continuously propel the vehicle to increased depths. Inasmuch as this mode of submerging may be impractical or undesirable under certain conditions the aforementioned ballasting means is of a capacity to enable the vehicle to be rendered negatively buoyant so that it may submerge by virtue of its own weight. When submerging in this manner, the vehicle need not be propelled through the water and there is no downwardly directed lift generated by the depressor vehicle 14. The depressor vehicle 14 serving no useful function, may therefore be retracted and secured to the hull 10 if desired.

As shown in FIGURE 1, one method for propelling my vehicle includes the propellor 32 which in turn is driven by means of a conventional marine drive shaft 34. Power is supplied to the drive shaft 34 by either an internal combustion engine 36 or a battery powered electric motor 38. The engine 36 and motor 38 are contained within a sealed compartment 40 defined by the bulkheads 42 and 44. The compartment 40 is in communication with a snorkel tube 46 which is intended to extend above the water surface when the vehicle is operating in the sub-surface effect mode. The snorkel 46 enables air to flow from the atmosphere into the compartment 40 and thereafter be inducted into the engine 36. Should the snorkel tube 46 become blocked for a short period of time, the engine 36 will continue to run on the air contained within the compartment 40. When the vehicle is to be used at substantially greater depths, the snorkel tube 46 which is pivotally mounted to the hull at the pivot 48 is swung downwardly to the position illustrated in phantom in FIGURE 1 to reduce drag. It should be noted that the vehicle is capable of supporting a snorkel 46 of considerably greater length than that used by an ordinary submarine. As shown in FIG. 1 the snorkel 46 is not much shorter than the vehicle itself. When operating at greater depths the engine 36 is shut off and the drive shaft 34 is driven by means of the electric motor 38. Storage batteries 50 are contained within suitable compartments in the hull as indicated in FIGURE 1 and are operatively connected to the motor 38. The motor 38 is connected to the drive shaft 34 by means of suitable gearing 52. A fuel tank 72 is provided as shown in FIGURE 1 and in operative communication with the engine 36.

A forward bulkhead 54 is provided at the nose of the vehicle and serves to enclose the instrumented cockpit 56. A passenger compartment 58 is disposed between the bulkheads 44 and 54 and extends upwardly into a pod 60 that is formed integrally with the hull 10. Windows 62 and 64 are provided in the cockpit 56 and passenger compartment 58 respectively. The pod 60 and windows 64 are preferably disposed at an elevation to enable the vehicle to be operated in the sub-surface effect mode at shallow depths with the windows 64 protruding above the water surface as shown by the reference character 27 in FIG. 1. A hatch cover 66 seals the top of the pod 44 and provides access to the passenger compartment 58. Doors 68 and 70 provide access from the passenger compartment 58 to the cockpit 56 and engine compartment 40 respectively. The compartment 58 may be internally pressurized to allow divers to enter and exit from the vehicle. This pressurization capability of the compartment 58 enables it to be used as a decompression chamber when divers have been working at great depths.

Pitch attitude trim may be adjusted by means of a water ballast tank 74 that is contained within the tail section of the hull 10. The pitch ballast tank 74 may be alternatively flooded or evacuated to compensate for the variations in pitch of the vehicle due to the weight of the occupants and pay load of the vehicle so as to enable the hydrofoils 12 to be disposed at the desired angle of attack.

As is shown in FIGURES 2 and 3, a pair of buoyancy ballast tanks 76 are contained within the hull 10 and may be flooded or evacuated to a desired degree to provide the corresponding desired buoyancy. For example, when it is intended to maneuver at the surface, as when the vehicle is being docked, the ballast tanks 76 are fully evacuated so that the vehicle may float atop the water surface thereby providing minimum vehicle draft and maximum freeboard to provide easy accessibility to the vehicle interior. A representative maximum buoyancy value for a 13,000 pound vehicle would be approximately 1,000 pounds positive buoyancy. When operating below the surface of the water but within the range of the sub-surface effect, the ballast tanks 76 are filled to the degree necessary to provide a slight positive buoyancy. A slight positive buoyancy provides a fail-safe feature which will cause the vehicle to float to the surface in the event of a power failure. As mentioned earlier when the vehicle is submerged and is operating in the sub-surface effect range, the ideal condition would be to maintain the vehicle at neutral buoyancy. Neutral buoyancy is desirable since the sub-surface effect is a dynamic phenomenon and the introduction of an unrelated static force (buoyancy) would necessitate constant dynamic trim adjustment as the speed of the vehicle is changed. A representative value of the maximum desired positive buoyancy when operating a 13,000 pound vehicle within the sub-surface effect range would be between 25 and 50 pounds of buoyancy. This value is close enough to neutral buoyancy so as to alleviate the necessity of constantly changing the trim as the speed is changed, but to enable the vehicle to float to the surface in the event of a power failure.

When operating at submerged depths below the range of the sub-surface effect, the ballast tanks 76 should normally be flooded to the degree necessary to provide neutral buoyancy so that when the vehicle is at minimum or zero speed it will not radically change its depth. An additional fail-safe feature is provided to enable the vehicle to float to the surface in the event of power failure or for another emergency. This fail-safe feature contemplates the use of a dischargeable ballast 78 which is secured to the nose of the craft and which may be mechanically released. This will provide a definite positive buoyancy which will enable the craft to rise to the surface in a bow-up attitude. It is also desirable as mentioned earlier to provide buoyancy ballast tanks 76 of a capacity to enable the vehicle to be trimmed to a negative buoyancy to enable the vehicle to submerge at zero or low speed should this be desired. Maintaining neutral or negative buoyancy greatly facilitates the ability of the craft to hover or anchor on the bottom.

In summary, I have disclosed a self-propelled water vehicle capable of operating as a surfaced or submerged craft which is highly flexible in used an which is particularly adapted for marine exploration or survey missions. My vehicle incorporates a design intended to utilize the "sub-surface effect" so that when traveling through the water just below the surface the vehicle will display an inherent depth and roll stability thus facilitating hands-off operation and enabling the operator to more efficiently focus his attention elsewhere such as to the objects of the particular mission. The dry-cabin nature of my vehicle helps to maintain passenger alertness for a longer period of time than would a wet-cabin vehicle. I have found that operation in the "sub-surface effect" range provides greater safety than a true submarine, a more comfortable ride, particularly in rough seas and minimizes the wave making resistance of a displacement hull when compared to operation of the same hull at the surface of the water. Another advantage of using my vehicle is that when diving primary attention need only be given to two axes of navigation instead of the conventional three.

In addition to submerged operation at sub-surface effect depth my vehicle is capable of diving to greater depths while retaining its inherent roll stability characteristics. A number of fail-safe features are incorporated to enable the vehicle to float to the surface should an emergency arise.

Having described my invention, I claim:

1. A sub-surface vehicle comprising:
   a hull;
   hydrofoil means secured to and extending laterally from said hull in winglike fashion, said hydrofoil means being adapted to develop positive hydrodynamic lift as said hull is propelled through a body of water;
   a depressor vehicle adapted to develop negative hydrodynamic lift of a relatively invariable magnitude which magnitude is less than said positive lift generated by said hydrofoil means and in a direction tending to continuously submerge said depressor vehicle when said depressor vehicle is propelled through said body of water so as to oppose said positive lift of said hydrofoil means;
   towing means connecting said depressor vehicle to said hull so as to enable said depressor vehicle to be towed by said hull, said towing means transmitting said submerging force to said hull and said hydrofoil means when said hull is propelled through said water;
   whereby a tendency to decrease the magnitude of positive lift developed by said hydrofoil means when said hydrofoil means is disposed in proximity to the surface of said body of water will be counterbalanced by said relatively invariable negative lift of said depressor vehicle thereby maintaining said hull at a substantially constant depth; and
   control means for intentionally overriding said lifting forces of said hydrofoil means and said depressor vehicle to cause said vehicle to change its depth.

2. A vehicle as claimed in claim 1 wherein said control means for intentionally overriding the lifting forces of said hydrofoil means and said depressor vehicle comprises:
   elevator means supported by said hull for effecting a change in the pitch attitude of said hull and said hydrofoil means secured thereto thereby varying the angle of attack of said hydrofoil means and hence the magnitude of positive lift developed by said hydrofoil means.

3. A vehicle as claimed in claim 2 wherein said control means further comprises:
   ballast means for varying the buoyancy of said vehicle between a positive and negative buoyancy and to enable said vehicle to be trimmed to a neutral buoyancy.

4. A vehicle as claimed in claim 2 further comprising:
   trim ballasting means for varying the pitch attitude of said vehicle.

5. A vehicle as claimed in claim 2 further comprising:
   means supported by said hull for self propulsion of said vehicle.

6. A vehicle as claimed in claim 5 further comprising:
   ballasting means for varying the buoyancy of said vehicle between a positive and negative buoyancy and to enable said vehicle to be trimmed to a condition of neutral buoyancy.

7. A vehicle as claimed in claim 1 further comprising:
   means supported by said hull for self propulsion of said vehicle.

8. A vehicle as claimed in claim 1 wherein said control means for overriding said lifting forces of said hydrofoil means and said depressor vehicle comprises:
   ballast means for varying the buoyancy of said vehicle between a positive and negative buoyancy, said negative buoyancy being of a magnitude sufficient to overcome the dynamic lifting force generated by said hydrofoil means.

9. A vehicle as claimed in claim 8 further comprising:
   means supported by said hull for self propulsion of said vehicle.

10. A vehicle as claimed in claim 8 further comprising:
    trim ballasting means for varying the pitch attitude of said vehicle.

11. A sub-surface vehicle comprising:
    a hull;
    hydrofoil means secured to and extending laterally from said hull in winglike fashion, said hydrofoil means being adapted to develop positive dynamic lift as said hull is propelled through a body of water;
    a depressor vehicle adapted to develop negative hydrodynamic lift of a relatively invariable magnitude which magnitude is less than said positive lift generated by said hydrofoil means and in a direction tending to continuously submerge said depressor vehicle when said depressor vehicle is propelled through said body of water so as to oppose said positive lift of said hydrofoil means;
    towing means connecting said depressor vehicle to said hull so as to enable said depressor vehicle to be towed by said hull, said towing means transmitting said submerging force to said hull and said hydrofoil means when said hull is propelled through said water;
    whereby any tendency to decrease the magnitude of the positive lift developed by said hydrofoil means when said hydrofoil means is disposed in proximity to the surface of said body of water will be counterbalanced by said relatively invariable negative lift of said depressor vehicle thereby maintaining said hull at a substantially constant depth; and
    means for retracting said towing means into said hull thereby drawing said depressor vehicle toward said hull so as to enable said depressor vehicle to be secured thereto.

12. A vehicle as claimed in claim 9 wherein the means for securing said depressor vehicle to said hull comprises:
    a cradle secured to said hull being adapted to snugly receive said depressor vehicle.

13. A sub-surface vehicle comprising:
    a hull;
    hydrofoil means secured to and extending laterally from said hull in winglike fashion, said hydrofoil means being adapted to develop positive dynamic lift as said hull is propelled through a body of water;
    a depressor vehicle adapted to develop negative hydrodynamic lift of a relatively invariable magnitude which magnitude is less than said positive lift generated by said hydrofoil means and in a direction tending to continuously submerge said depressor vehicle when said depressor vehicle is propelled through said body of water so as to oppose said positive lift of said hydrofoil means;
    towing means connecting said depressor vehicle to said hull so as to enable said depressor vehicle to be freely towed by said hull, said towing means being connected to said hull so as to be at lateral alignment with the center of buoyancy of said vehicle when said hydrofoil means is disposed in a level attitude so that said towing means may transmit said downwardly directed submerging force to said hull and said hydrofoil means at a point that is in lateral alignment with the center of buoyancy of said vehicle;
    whereby any tendency for the vehicle to roll about its longitudinal roll axis will cause said center of buoyancy and the downwardly directed submerging force of said depressor vehicle to effect a turning moment in opposition to that of the direction of roll of said vehicle thereby tending to stabilize said vehicle.

References Cited

UNITED STATES PATENTS

| | | | |
|---|---|---|---|
| 2,980,047 | 4/1961 | Korganoff et al. | 114—16 |
| 3,082,975 | 3/1969 | Cardwell et al. | 114—16 X |
| 3,137,264 | 6/1964 | Brainard et al. | |
| 3,183,871 | 5/1965 | Reder | 114—16 X |

TRYGVE M. BLIX, Primary Examiner

U.S. Cl. X.R.

114—235

PO-1050
(5/69)

UNITED STATES PATENT OFFICE
CERTIFICATE OF CORRECTION

Patent No. 3,492,962　　　　　　　　Dated February 3, 1970

Inventor(s) Edward C. Brainard, II

It is certified that error appears in the above-identified patent and that said Letters Patent are hereby corrected as shown below:

In claim 1, column 7, line 32 change "a" to --any--

In claim 13, column 8, line 50 after "positive" insert --hydro--

SIGNED AND
SEALED
JUN 23 1970

(SEAL)
Attest:

Edward M. Fletcher, Jr.
Attesting Officer

WILLIAM E. SCHUYLER, JR.
Commissioner of Patents